(12) United States Patent
Feichtinger et al.

(10) Patent No.: US 8,044,760 B2
(45) Date of Patent: Oct. 25, 2011

(54) FOUR-LAYER ELEMENT AND METHOD FOR PRODUCING A FOUR-LAYER ELEMENT

(75) Inventors: Thomas Feichtinger, Graz (AT); Guenter Engel, Leibnitz (AT); Volker Wischnat, Deutschlandsberg (AT); Thomas Hoelbling, Graz (AT)

(73) Assignee: EPCOS AG, Munich (DE)

( * ) Notice: Subject to any disclaimer, the term of this patent is extended or adjusted under 35 U.S.C. 154(b) by 108 days.

(21) Appl. No.: 12/536,000

(22) Filed: Aug. 5, 2009

(65) Prior Publication Data

US 2010/0025075 A1    Feb. 4, 2010

Related U.S. Application Data

(63) Continuation of application No. PCT/EP2008/051618, filed on Feb. 11, 2008.

(30) Foreign Application Priority Data

Feb. 13, 2007   (DE) .................... 10 2007 007 113

(51) Int. Cl.
*H01C 7/10* (2006.01)

(52) U.S. Cl. .................... 338/20; 338/22 R; 338/309

(58) Field of Classification Search ............... 338/22 R, 338/204, 328, 332, 260, 254, 320
See application file for complete search history.

(56) References Cited

U.S. PATENT DOCUMENTS

| | | | |
|---|---|---|---|
| 4,906,512 A * | 3/1990 | Roess | 428/192 |
| 6,078,250 A * | 6/2000 | Ueda et al. | 338/313 |
| 6,556,123 B1 * | 4/2003 | Iwao et al. | 338/22 R |
| 7,075,408 B2 * | 7/2006 | Mihara et al. | 338/22 R |

FOREIGN PATENT DOCUMENTS

| | | |
|---|---|---|
| DE | 27 37 509 | 3/1979 |
| DE | 44 10 504 B4 | 9/1994 |
| DE | 196 34 496 C1 | 4/1998 |
| DE | 199 04 727 B4 | 8/1999 |
| DE | 100 18 377 C1 | 12/2001 |
| DE | 102 35 011 A1 | 2/2004 |
| DE | 10 2004 014 157 A1 | 10/2004 |
| DE | 10 2004 005 664 A1 | 9/2005 |
| EP | 0 301 321 A1 | 2/1989 |
| EP | 0 827 160 A1 | 3/1998 |
| JP | 03-239303 | 10/1991 |

* cited by examiner

*Primary Examiner* — Kyung Lee
(74) *Attorney, Agent, or Firm* — Slater & Matsil, L.L.P.

(57) ABSTRACT

A multilayer element has a body in which at least one first internal electrode and at least one second internal electrode are arranged. These internal electrodes have an overlapping region, which extends up to the surface of the body on at least one side. The internal electrodes have a recess in a corner region of the body.

20 Claims, 4 Drawing Sheets

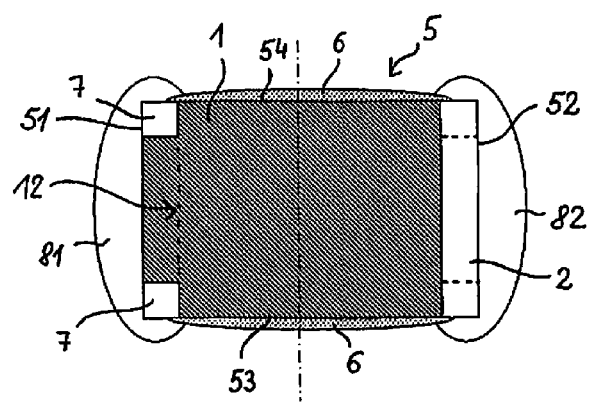
Fig. 1A
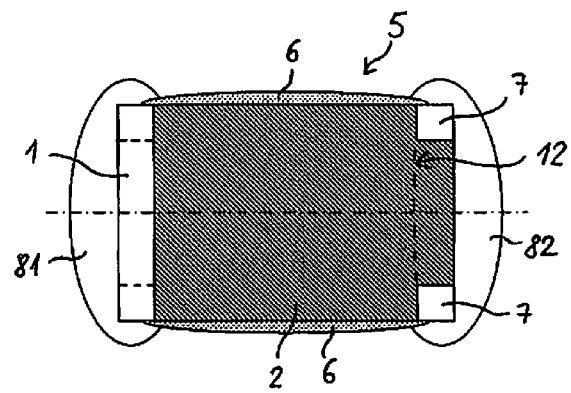
Fig. 1B
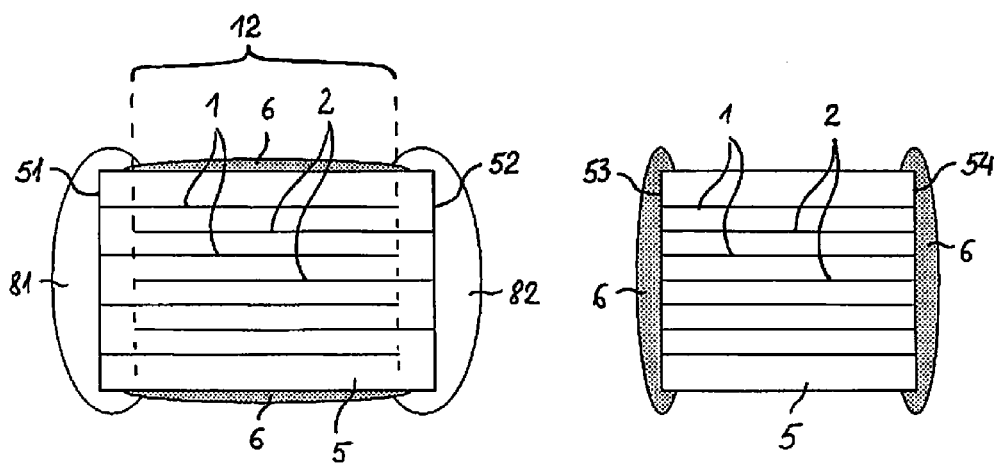
Fig. 1D
Fig. 1C

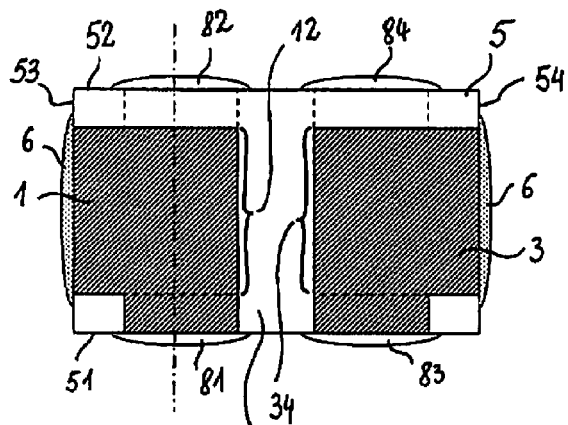
Fig. 3A
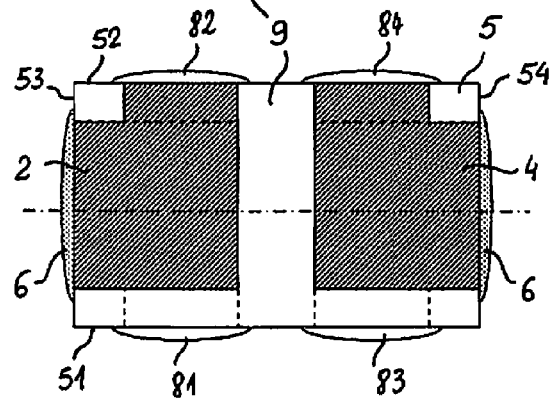
Fig. 3B
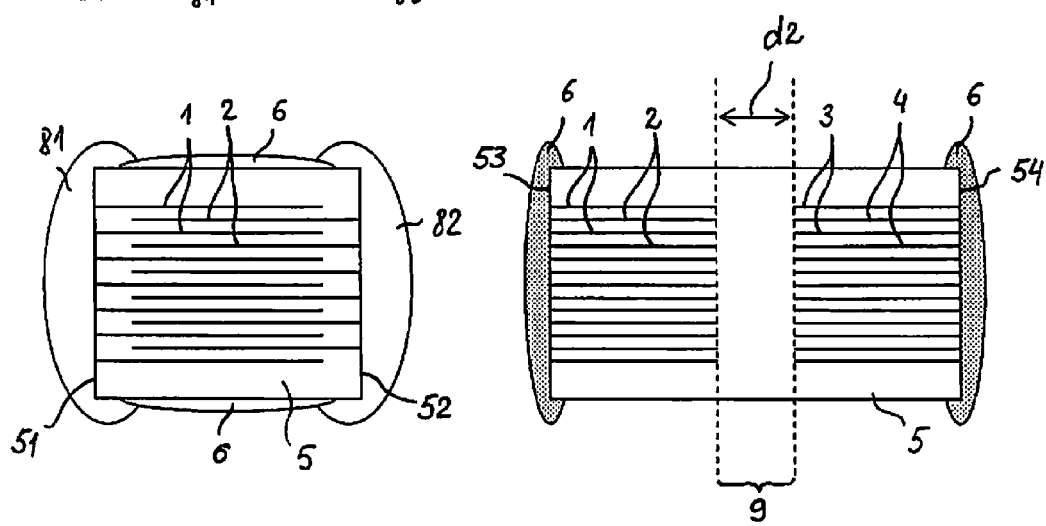
Fig. 3C
Fig. 3D ion, at least two third internal electrodes and at least two fourth internal electrodes. The internal electrodes of each kind are electrically connected by an associated external electrode.

FOUR-LAYER ELEMENT AND METHOD FOR PRODUCING A FOUR-LAYER ELEMENT

This application is a continuation of co-pending International Application No. PCT/EP2008/051618, filed Feb. 11, 2008, which designated the United States and was not published in English, and which claims priority to German Application No. 10 2007 007 113.4 filed Feb. 13, 2007, both of which applications are incorporated herein by reference.

BACKGROUND

An electrical four-layer element is described in the publications DE 10 2004 005 664 A1 and JP 03239303 A.

SUMMARY

A task that is to be solved is to specify an electrical element that has an especially large active area.

A four-layer element with a body in which there is at least one first internal electrode and at least one second internal electrode, which have an overlapping region that extends on at least one side up to the surface of the body is specified.

The specified element is characterized by especially high capacitance, since the base area of the body is utilized in an efficient way to form a capacitance element. The capacitance value rises with increasing area of the overlapping electrodes.

Preferably, the body has ceramic layers between which the internal electrodes are arranged. The ceramic layers can be dielectric. They can be piezoelectric, for example. The ceramic layers can also be electrically conducting in at least one temperature range.

The first and second internal electrodes have outer edges reaching the surface of the body, which are covered with an electrically isolating passivation layer. This applies to at least one side surface of the body. It is also possible that the outer edges of the first and second internal electrodes reach at least two sides on the surface of the body.

The passivation layer covers at least one part of the body, in one variation the entire body, protects the internal electrodes extending up to the surface of the body from moisture and other harmful environmental effects. The variation in which the passivation layer completely covers the body is especially advantageous.

In an advantageous variation, the body has two first side surfaces that are parallel to each other and two second side surfaces that are parallel to each other. The minimum of one first internal electrode is connected to a first external electrode, and the minimum of one second internal electrode is connected to a second external electrode. The external electrodes are arranged on at least one of the first side surfaces of the body. The overlapping region of the first and second internal electrodes extends up to at least one of the second side surfaces of the body. The overlapping region extends in one variation up to both second side surfaces of the body.

In an advantageous variation, there is in the body at least one third internal electrode and at least one fourth internal electrode, where these internal electrodes have an overlapping region that extends to at least one side up to the surface of the body.

The minimum of one third and one fourth internal electrode each has outer edges that reach the surface of the body that are preferably covered with the passivation layer. Otherwise, the description of the first and second internal electrodes is valid for the third and fourth internal electrodes.

A first internal electrode and a third internal electrode are arranged next to each other in a first plane, and a second internal electrode and a fourth internal electrode are arranged next to each other in a second plane. The minimum first and second internal electrodes, together with the ceramic layers lying between the first and second internal electrodes, form a first functional unit. The minimum of one third and one fourth internal electrode, together with the ceramic layers lying between the third and fourth internal electrodes, form a second functional unit, which is separated from the first functional unit by a separation region and is preferably electrically isolated from it.

In principle, more than just two functional units can be integrated into the body. A functional unit is understood to be, for example, a capacitance element or a resistance element, preferably a varistor element, which is integrated in the body of the element.

The internal electrodes each preferably have at least one recess in at least one corner region of the body, since corner regions have an increased risk of crack formation, which then can affect the electrical properties of the functional unit.

In one variation, there are a number of internal electrodes of each kind, thus, at least two first internal electrodes and at least two second internal electrodes, optionally, and in addition, at least two third internal electrodes and at least two fourth internal electrodes. The internal electrodes of each kind are electrically connected by an associated external electrode.

The internal electrodes can, for example, contain the following metals or metal alloys: Ag, AgPd, AgPt, Pt, Cu, Ni.

For each type of internal electrode, there is preferably at least one associated external electrode provided. The external electrode is accessible from outside and serves for contact to the element from outside.

The external electrode is preferably situated at least partially on a side surface of the element, for example, on a side surface of the body. The edge regions of the external electrode can also be arranged on the upper side and/or the under side of the body. At least one part of the external electrode can also be arranged on the passivation layer.

The body in one variation contains a varistor ceramic. The varistor ceramic can contain, for example, ZnO—Bi, ZnO—Pr or other suitable materials.

The body can also contain a capacitor ceramic. Possibilities as capacitor ceramics are, for example, the following ones: NP0, X7R, X8R, Z5U. These designations refer to the temperature classes of ceramic materials. In an advantageous variation, the body includes at least one layer of a varistor ceramic and at least one layer of a capacitor ceramic.

The functional unit can, for example, be designed as a multilayer capacitance. Alternatively, the functional unit can be designed as a multilayer resistance. The functional unit can also contain a capacitance and a resistance that are electrically connected together.

In one variation, the passivation layer contains glass. In principle, the passivation layer can contain a ceramic material.

In another embodiment, the passivation layer contains the same ceramic material as the body. Preferably, the passivation layer consists of the same ceramic as the body.

The passivation layer covers at least the region of the side surface of the body in which the internal electrodes extend up to the edge of the body without exposing the passivation layer. The passivation layer can also cover the entire body. A part of the passivation layer can be arranged under the external electrodes, where the passivation layer is connected between the internal electrodes of the relevant types and the external electrodes connecting them.

The first internal electrodes are electrically connected to a first external electrode and spaced and electrically isolated from a second external electrode. The second internal electrodes are electrically connected to the second external electrode and are spaced and electrically isolated from the first external electrode. This applies in a corresponding way for the third and fourth internal electrodes and the third and fourth external electrodes.

In an advantageous variation, each internal electrode has a region with reduced width, which is turned toward the external electrode and connected to it.

The specified element can, for example, be produced in a method having the following steps. First ceramic foils are imprinted with a conductive paste, for example, a metal paste, preferably in a screen printing process. The imprinted ceramic foils are stapled on top of each other and laminated. The formed stack is compressed, decarburized and sintered. Before the decarburization or after the sintering, the stack can be separated to form a plurality of precursor elements. Each precursor element has one body.

In one variation, the paste used for the internal electrodes can have a higher sintering shrinkage than the ceramic foils. Through this, the internal electrodes draw back during the sintering operation. Then, the internal electrodes are externally closed in outwardly by the material of the passivation layer. Alternatively, the resulting spaces can be filled in the application of the passivation layer. It is also possible that the internal electrodes have already drawn back before the sintering enough that they become co-sintered, thus, they become externally sealed by the ceramic foils during the sintering.

The precursor elements are abraded, etched or subjected to a similar process to expose the internal electrodes. In particular, regions of the internal electrodes that are intended for connection to the external electrodes are exposed.

The body of the relevant precursor element is passivated. In this case, an electrically isolating passivation layer is generated on one surface. This step takes place, in one variation, after exposing the internal electrodes. Alternatively, it is possible to apply the passivation layer before the decarburization and to sinter it together with the body.

Preferably after the passivation, external electrodes are produced on the side surfaces of the body, for example, in an immersion process. The external electrodes can, however, also be produced before the passivation. The body is immersed in a conducting paste, which is then dried and fired.

The passivation layer can be applied to the body in a spray process, for example. A relatively thin layer with homogeneous thickness is produced in this case. The thickness of the passivation layer is preferably chosen to be under 20 μm. When the external electrodes are etched in, a sufficiently thin layer is breached in regions that lie between the external electrode and the internal electrodes turned toward it, so that a conducting connection arises between each internal electrode and its associated external electrode.

The external electrodes can be covered by at least one additional layer. Preferably, at least one layer that contains Ag, Pt and/or Ni is deposited in an electrolytic process. The uppermost layer can be formed by a solderable layer.

The external electrodes can contain, for example, the following metals or metal alloys: Ag, AgPd, AgPt, Pt, Cu, Ni.

BRIEF DESCRIPTION OF THE DRAWINGS

Below, the specified elements and their advantageous embodiments are explained by means of schematic, not-to-scale figures. Here:

FIGS. 1A and 1B show top views of different metallization planes of an element in accordance with the first embodiment;

FIG. 1C shows the element in FIGS. 1A and 1B in a first cross section;

FIG. 1D shows the element in FIGS. 1A and 1B in a second cross section;

FIGS. 3A and 3B show top views of different metallization planes of an element with two functional units;

FIGS. 3C and 3D show the element in FIGS. 3A and 3B in first and second cross sections;

Figure 2A:
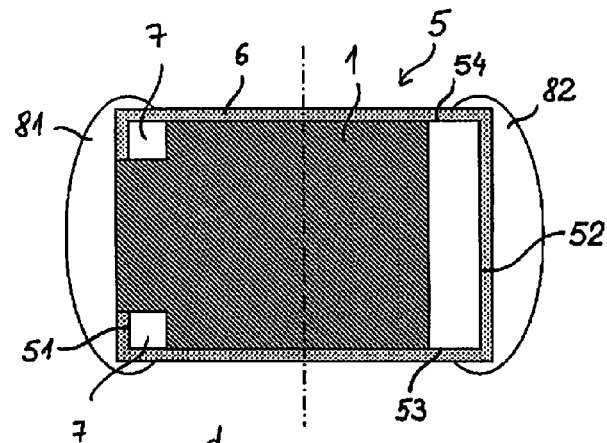
FIGS. 2A and 2B show top views of different metallization planes of an element in accordance with the second embodiment.

The following list of reference symbols may be used in conjunction with the drawings:

1 First internal electrode
12 Overlapping region of electrodes 1 and 2
2 Second internal electrode
3 Third internal electrode
4 Fourth internal electrode
5 Body
51, 52 First side surfaces of body
53, 54 Second side surfaces of body
6 Passivation layer
7 Recess
81 First external electrode
82 Second external electrode
9 Separation region
d Distance between internal electrode and external electrode of opposite polarity
d2 Width of separation region 9
t Thickness of passivation layer 6

DETAILED DESCRIPTION OF ILLUSTRATIVE EMBODIMENTS

FIGS. 1A-1D present a first embodiment of the element with one functional unit. The cross sections shown in FIGS. 1C and 1D show cross sections through the broken lines that can be seen in FIGS. 1A and 1B. This also correspondingly applies to FIGS. 2A-2D, 3A-3D and 4A-4D.

The element has a body 5. First internal electrodes 1 and second internal electrodes 2 are arranged in body 5. The first internal electrodes 1 are electrically connected to a first external electrode 81. The second internal electrodes 2 are electrically connected to a second external electrode 82 and are electrically isolated from the first internal electrodes 1. The first and second internal electrodes 1, 2 are arranged in an alternating sequence and form an electrode stack. The electrode stack and the ceramic layers of the body 5 that lie between the internal electrodes 1, 2 form a functional unit.

The body 5 has first side surfaces 51 and 52, which run parallel to each other. The body additionally has second side surfaces 53 and 54, which are parallel to each other and perpendicular to the first side surfaces 51 and 52.

The external electrodes 81 and 82 are mainly arranged on the side surfaces 51 and 52 of the body. However, parts of the external electrodes 81, 82 are also arranged on the underside and upper side of the body 5.

In overlapping region 12, a region of the first internal electrode 1 is arranged in the vertical direction opposite a region of the second internal electrode 2 turned toward it; see FIG. 1D. This region forms an active volume of the functional unit, for example, a multilayer capacitance element or a multilayer resistance element.

The overlapping region 12 extends up to the second side surfaces 53 and 54 of body 5. The edges of the internal electrodes 1 and 2, thus, reach the side surfaces 53 and 54. These exposed edges are covered by means of passivation layers 6.

Each first internal electrode 1 has a region with reduced width, which is turned toward the first external electrode 81 and connected to it. Each second internal electrode 2 has a region with reduced width, which is turned toward the second external electrode 82 and is connected to it. To form the region with reduced width, recesses 7 of internal electrodes 1 and 2 are provided in corner regions.

The first internal electrode 1 is arranged at a distance from the second external electrode 82. The second internal electrode 2 is arranged at a distance from the first external electrode 81.

The external electrodes 81 and 82 can be produced in an immersion process. The passivation layers 6 can be applied to the region of the second side surfaces 53 and 54, that is, provided for them in a screen printing process using a mask.

A second embodiment of the element with one functional unit is shown in FIGS. 2A-2D. In contrast to the previous variation, the passivation layer 6 covers the body 5 over its entire surface here. The passivation layer 6 is breached, or connected through, only for a connection between the internal electrodes 1, 2 and their associated external electrodes 81, 82. Each through-connection is maximally only as big as the cross section of the region with reduced width of the relevant internal electrode 1, 2.

Figure 2B:
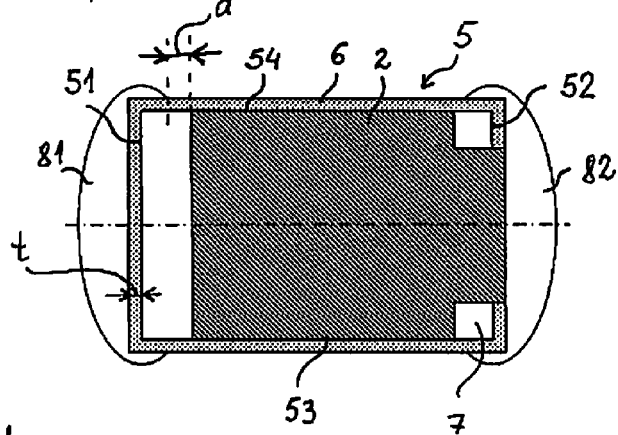
Figure 2D:
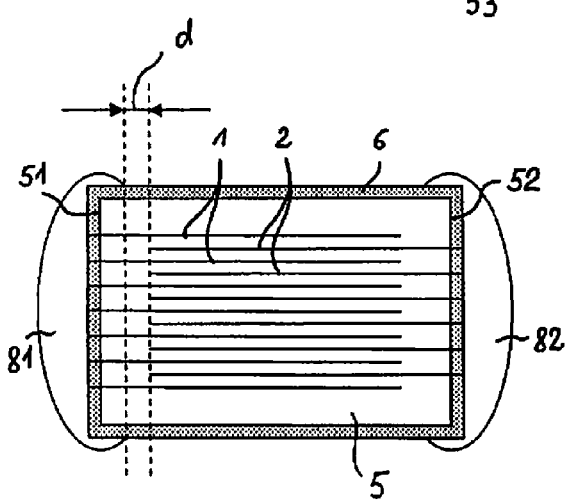
FIGS. 2C and 2D show the element in FIGS. 2A and 2B in first and second cross sections.
Figure 2C:
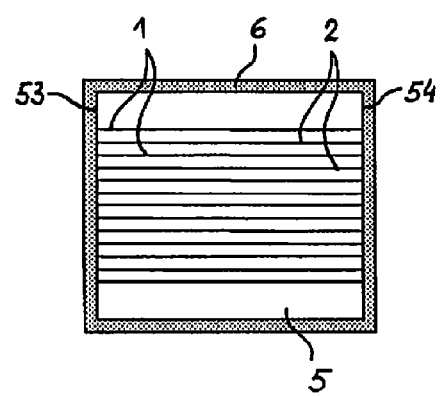
Figure 4A:
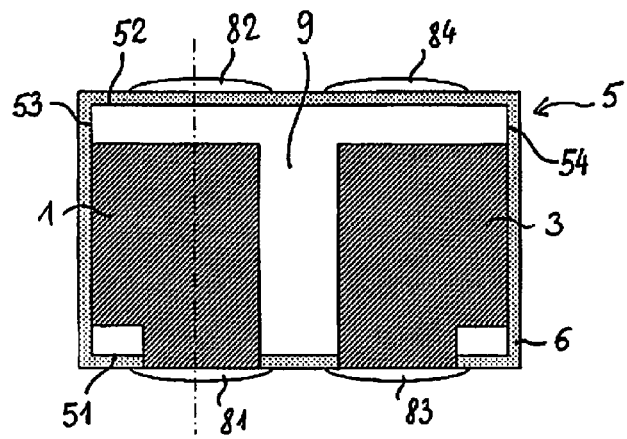
FIGS. 4A and 4B show top views of different metallization planes of an element with two functional units and a passivation layer that covers the entire body.
Figure 4B:
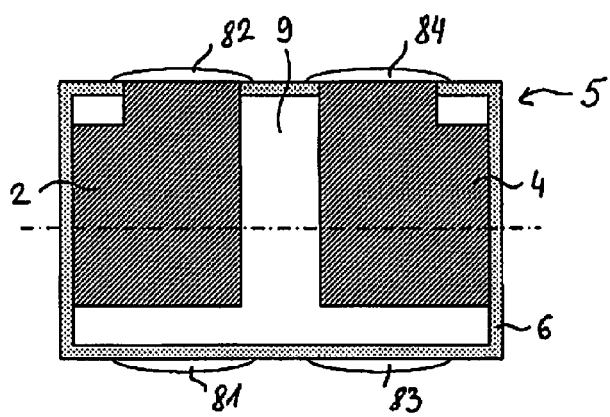
Figure 4C:
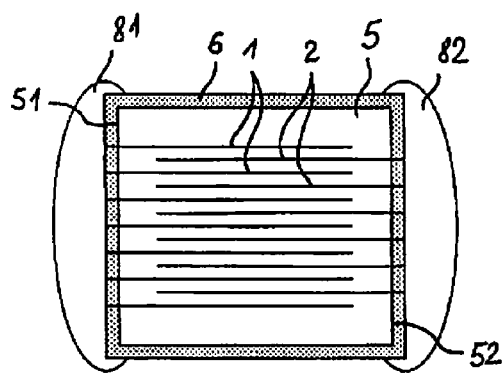
FIGS. 4C and 4D show the element in FIGS. 4A and 4B in first and second cross sections.
Figure 4D:
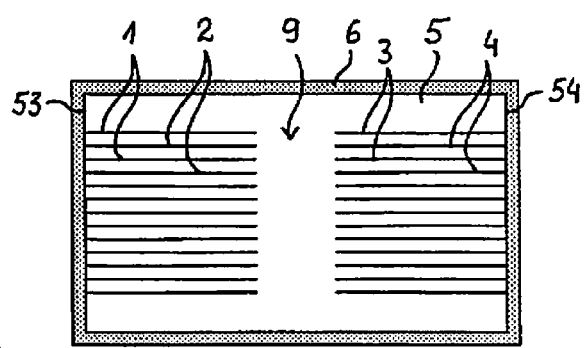

Since a thin passivation layer 6 is breached in the region of the exposed edges of the internal electrodes 1, 2, preferably the distance d between one internal electrode, internal electrode 2 in FIG. 2B, and the external electrode of the opposite polarity, in this case, external electrode 81, is overall greater than the thickness t of the passivation layer 6. This applies to all second internal electrodes 2 and correspondingly also for the internal electrodes 1 and the external electrode 82.

In FIGS. 3A-3D, an embodiment of the element is shown in which two functional units are arranged in a common body 5. Between the functional units, there is an electrically isolating separation region 9. The width d2 of the separation region 9 is preferably greater than the distance between a first internal electrode 1 and the next second internal electrode 2. The distance between the functional units, therefore, is preferably greater than the thickness of a ceramic layer.

The first external electrode 81 of the first functional unit and the first external electrode 83 of the second functional unit are arranged on the first side surface 51 of the body. The second external electrode 82 of the first functional unit and the second external electrode 84 of the second functional unit are arranged on the other first side surface 52 of the body.

The statements made in connection with FIGS. 1A-1D also apply to the first functional unit, which is arranged on the left hand side in FIGS. 3A and 3B.

Correspondingly, the statements made in connection with FIG. 1A-1D apply to the second functional unit, which is arranged on the right hand side in FIGS. 3A and 3B. The second functional unit has first internal electrodes 3 and second internal electrodes 4, which overlap in an overlapping region 34.

In contrast to the variation in FIGS. 1A-1D, in this case, the relevant overlapping region 34 extends only to one side up to the surface of the body 5. The overlapping region 12 reaches the second side surface 53, and the overlapping region 34 reaches the second side surface 54. The exposed edges of the internal electrodes 3 and 4 are also covered by a passivation layer 6.

Otherwise, the description of FIGS. 1A-1D also applies to the variation shown in FIGS. 3A-3D.

An element with two functional units is shown in FIGS. 4A-4D, where the overlapping region of the inner electrodes of each functional unit extends only up to a second side surface 53 or 54 of body 5. The body 5 is covered over its entire surface by passivation layer 6.

The variation shown in FIGS. 4A-4D is a combination of the variations in FIGS. 2A-2D and 3A-3D. The description of the previously explained variations also applies to this embodiment.

The embodiment potentials of the specified element are not exhausted by the variations explained in the figures or the material data that is given. In particular, the basic shape of the body, the internal electrodes and the external electrodes can be as desired.

What is claimed is:

1. A multilayer element comprising:
   a body;
   a first internal electrode arranged in the body; and
   a second internal electrode arranged in the body,
   wherein the first and second internal electrodes have an overlapping region that extends to a surface of the body on at least one side,
   wherein the first and second internal electrodes each have a recess in a respective corner region of the body, and
   wherein the first and second internal electrodes have outer edges meeting the surface of the body, the outer edges being covered by a passivation layer.

2. The multilayer element as in claim 1, wherein the body has two parallel first side surfaces and two parallel second side surfaces, wherein the first and second internal electrodes are connected to external electrodes that are arranged on at least one of the first side surfaces of the body, and wherein the overlapping region extends up to at least one of the second side surfaces of the body.

3. The multilayer element as in claim 1, further comprising a third internal electrode and a fourth internal electrode arranged in the body, wherein the third and fourth internal electrodes have an overlapping region that extends up to the surface of the body on at least one side, wherein the first and second internal electrodes form a first functional unit, and the third and fourth internal electrodes form a second functional unit, which is separated from the first functional unit by a separation region.

4. The multilayer element as in claim 3, wherein the first and third internal electrodes are arranged in a first plane, and wherein the second and fourth internal electrodes are arranged in a second plane.

5. The multilayer element as in claim 3, wherein the third and fourth internal electrodes have outer edges that meet the surface of the body, the outer edges being covered by a passivation layer.

6. The multilayer element as in claim 1, wherein the body contains a varistor ceramic.

7. The multilayer element as in claim 1, wherein the body contains a capacitor ceramic.

8. The multilayer element as in claim 1, wherein the passivation layer contains glass.

9. The multilayer element as in claim 1, wherein the passivation layer and the body contain a same ceramic material.

10. The multilayer element as in claim 1, wherein a part of the passivation layer is arranged under an external electrode, wherein the passivation layer is disposed between the first and second internal electrodes and the external electrode on the at least one side of the body.

11. The multilayer element as in claim 1, wherein the passivation layer covers the body over its entire surface.

12. The multilayer element as in claim 2, wherein a distance between the first and second internal electrodes of a first polarity and an external electrode of an opposite polarity is overall greater than a thickness of the passivation layer.

13. The multilayer element as in claim 1, wherein the first internal electrode comprises only one single electrode and wherein the second internal electrode comprises only one single electrode.

14. The multilayer element as in claim 1, wherein the first internal electrode comprises a plurality of first parallel plates, and wherein the second internal electrode comprises a plurality of second parallel plates arranged in an alternating sequence with the plurality of first parallel plates.

15. A method for producing a multilayer element, the method comprising:
    applying an internal electrode paste to ceramic foils;
    stacking the ceramic foils on top of each other;
    laminating the stack of ceramic foils;
    decarburizing the stack of ceramic foils;
    sintering the stack of ceramic foils; and
    applying a passivation layer to at least parts of the stack of ceramic foils such that outer edges of internal electrodes are covered by a passivation layer.

16. The method as in claim 15, further comprising connecting internal electrodes that draw back due to the sintering to an outside surface by means of a material of the passivation layer.

17. The method as in claim 15, wherein the passivation layer is applied before sintering the stack of ceramic foils.

18. A multilayer element comprising:
    a body;
    a first internal electrode arranged in the body;
    a second internal electrode arranged in the body;
    a third internal electrode arranged in the body; and
    a fourth internal electrode arranged in the body,
    wherein the first and second internal electrodes have an overlapping region, which extends to a surface of the body on at least one side,
    wherein the first and second internal electrodes each have a recess in a respective corner region of the body,
    wherein the third and fourth internal electrodes have an overlapping region that extends up to the surface of the body on at least one side,
    wherein the first and second internal electrodes form a first functional unit, and
    wherein the third and fourth internal electrodes form a second functional unit that is separated from the first functional unit by a separation region.

19. The multilayer element as in claim 18, wherein the first and third internal electrodes are arranged in a first plane, and wherein the second and fourth internal electrodes are arranged in a second plane.

20. The multilayer element as in claim 18, wherein the third and fourth internal electrodes have outer edges that meet the surface of the body, the outer edges being covered by a passivation layer.

* * * * *